(12) United States Patent
Lambright

(10) Patent No.: US 9,796,433 B2
(45) Date of Patent: Oct. 24, 2017

(54) SPARE TIRE STORAGE APPARATUS

(76) Inventor: Michael Lambright, Middlebury, IN (US)

(*) Notice: Subject to any disclaimer, the term of this patent is extended or adjusted under 35 U.S.C. 154(b) by 1576 days.

(21) Appl. No.: 10/612,254

(22) Filed: Jul. 2, 2003

(65) Prior Publication Data

US 2005/0002765 A1    Jan. 6, 2005

(51) Int. Cl.
B62D 43/00 (2006.01)
B62D 43/06 (2006.01)

(52) U.S. Cl.
CPC .................................. B62D 43/06 (2013.01)

(58) Field of Classification Search
USPC ..... 414/463, 464, 465, 466, 523; 224/42.21, 224/42.23, 402, 42.11, 42.12, 42.13, 224/42.28, 42.29, 42.3, 538; 16/234, 235, 16/265, 266, 294, 296, 302, 303, 309, 16/310, 316; 49/237, 239; 403/160
See application file for complete search history.

(56) References Cited

U.S. PATENT DOCUMENTS

| | | | |
|---|---|---|---|
| 1,880,098 A * | 9/1932 | Mair .............................. | 285/184 |
| 2,399,207 A * | 4/1946 | Clark ............................ | 414/465 |
| 3,460,695 A * | 8/1969 | Steele .......................... | 414/466 |
| 3,494,493 A | 2/1970 | Fowler | |
| 3,648,867 A | 3/1972 | Beavers | |
| 3,760,965 A * | 9/1973 | Chandler ...................... | 414/462 |
| 3,785,518 A | 1/1974 | Johnson | |
| 3,904,093 A | 9/1975 | Hanela | |
| 4,047,629 A | 9/1977 | Klein | |
| 4,264,260 A * | 4/1981 | Krakow ........................ | 414/465 |
| 4,301,954 A * | 11/1981 | Briggs ....................... | 224/42.23 |
| 4,428,513 A | 1/1984 | Delmastro | |
| 4,708,574 A * | 11/1987 | Conboy et al. .............. | 414/591 |
| 4,964,552 A | 10/1990 | Terwilliger | |
| 4,976,384 A | 12/1990 | Daniels | |
| 5,076,629 A * | 12/1991 | Peters et al. ................. | 296/37.2 |
| 5,197,641 A | 3/1993 | Montgomery, Jr. | |
| 2002/0017543 A1* | 2/2002 | Dunsch et al. .............. | 224/489 |

* cited by examiner

Primary Examiner — Gregory W Adams

(57) ABSTRACT

A spare tire carrier for vehicles which includes a support arm for mounting a spare tire thereon and a cooperating tubular assembly coupled to a fixed end of the support arm for mounting the support arm to a vehicle. The cooperating tubular assembly includes upper and lower opposed guide plates which provide for relative rotational movement there between to simultaneously effect pivotal movement of the support arm with respect to the cooperative tubular assembly while effecting rotational movement of the support arm about its central axis. The spare tire carrier can be mounted to the underside of trucks, vans, recreational vehicles, campers, trailers, and other motorized and non-motorized and towed vehicles.

18 Claims, 4 Drawing Sheets

SPARE TIRE STORAGE APPARATUS

TECHNICAL FIELD

The present invention relates to devices and systems that are used to store spare tires on motored and non-motored vehicles, including towed vehicles. In particular, the present invention is directed to devices and systems that are used to store spare tires beneath the underside of motored and non-motored vehicles, including towed vehicles.

BACKGROUND ART

There are numerous devices and systems that are designed to store spare tires under the bodies and/or frames or chassis of vehicles such as trucks, vans, recreational vehicles, and the like. Such devices and systems are generally configured to: 1) move the tire between a stored position beneath a vehicle and an accessible position in which the tire may be removed from or replaced on a support structure; 2) raise and lower the tire between the stored position with sufficient ground clearance and the accessible position; and 3) hold the tire securely in place in the stored position.

Examples of spare tire holders that basically drop spare tires vertically between a stored position and an accessible position in a controlled manner are exemplified by U.S. Pat. No. 3,494,493 to Fowler, U.S. Pat. No. 3,904,093 to Hanela, U.S. Pat. No. 4,047,629 to Klein, U.S. Pat. No. 4,428,513 to Delmastro, U.S. Pat. No. 4,964,552 to Terwilliger, and U.S. Pat. No. 5,076,629 to Peters et al.

Examples of spare tire holders that both drop and horizontally pivot spare tires between a stored position and an accessible position are exemplified by U.S. Pat. No. 3,648,867 to Beavers, U.S. Pat. No. 3,785,518 to Johnson, U.S. Pat. No. 4,976,384 to Daniels, and U.S. Pat. No. 5,197,642 to Montgomery, Jr.

U.S. Pat. No. 4,976,384 to Daniels discloses a tire storage apparatus that both lowers a spare tire to the ground at a controlled rate and swings the tire out from under the vehicle in one movement without the necessity for the user to go under the vehicle and without the necessity for the user to support the weight of the tire. The apparatus of Daniels is complicated and includes a cam roller provided on an end of a carriage arm which rides along a cam surface. In addition to the bearings of the cam roller, the apparatus of Daniels also includes pivotal connections between the carriage arm and a horizontal and vertical pivot point, all of which are subject to adverse environmental conditions that are associated with the underside of a vehicle.

The present invention provides a tire storage system that provides for simultaneous lowering (or raising) and pivoting movement of a spare tire with few interacting elements.

DISCLOSURE OF THE INVENTION

According to various features, characteristics and embodiments of the present invention which will become apparent as the description thereof proceeds, the present invention provides a spare tire carrier for vehicles which comprises:
a support arm for mounting a spare tire thereon, the support arm having a fixed end and a free end and a central axis; and
a cooperating tubular assembly coupled to the fixed end of the support arm for mounting the support arm a vehicle, said cooperating tubular assembly including upper and lower opposed guide plates which provide for relative rotational movement there between to simultaneously effect pivotal movement of the support arm with respect to the cooperative tubular assembly while effecting rotational movement of the support arm about its central axis.

The present invention further provides a vehicle including a spare tire carrier mounted to an under side of the vehicle, which spare tire carrier comprises:
a support arm for mounting a spare tire thereon, the support arm having a fixed end and a free end and a central axis; and
a cooperating tubular assembly coupling the fixed end of the support arm to the under side of the vehicle, said cooperating tubular assembly including upper and lower opposed guide plates which provide for relative rotational movement there between to simultaneously effect pivotal movement of the support arm with respect to the cooperative tubular assembly while effecting rotational movement of the support arm about its central axis.

BRIEF DESCRIPTION OF DRAWINGS

The present invention will be described with reference to the attached drawings which are given as non-limiting examples only, in which:

FIG. 6 depicts the carrier 1 is in its stored or latched position. FIG. 7 depicts an intermediate position in which the carrier is between its stored or latched position and the position in which a spare tire mounted thereon is fully accessible. FIG. 8 depicts the carrier in the fully accessible position in which a spare tire mounted thereon can be easily removed (or remounted).

BEST MODE FOR CARRYING OUT THE INVENTION

The present invention is directed to devices and systems that are used to store spare tires beneath the underside of motored and non-motored vehicles, including towed vehicles. The device of the present invention, referred herein for convenience as a spare tire "carrier," is configured to simultaneously raise (or lower) and pivot a spare tire between a stored position and an accessible position. The carrier can be used in conjunction with trucks, vans, recreational vehicles, campers, trailers, and other motorized and non-motorized and towed vehicles. The carrier was can be used to provide access to a spare tire from either side or the front or rear of a vehicle.

The carrier includes a main support arm to which a spare tire can be removably mounted. One end of the main support arm is pivotally coupled to the underside of a vehicle and the opposite end of the main support arm is provided with a latch element. The latch element cooperates with a latching mechanism to secure the main support in its stored position. A tire mounting bracket is provided on the main support arm for removably securing a tire thereon.

The main support arm is pivotally coupled to the underside of a vehicle via a cooperating tubular assembly that includes guide surfaces that interact to cause the main support arm to raise and lower as upper and lower tubular elements of the assembly experience relative rotational movement. The upper tubular element is mounted to the underside of the vehicle via a suitable mounting plate or bracket. The lower tubular element is coupled to the main support arm or otherwise integral therewith.

Figure 1:
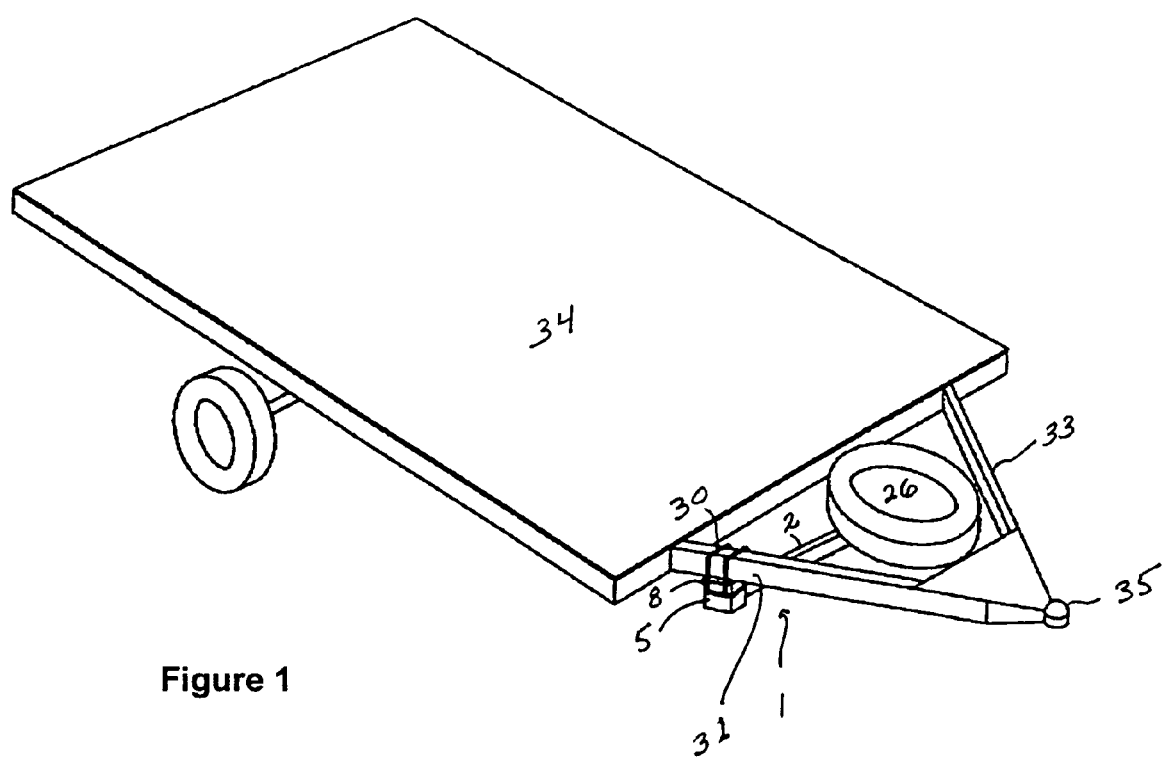
FIG. 1 is a perspective view of a trailer or camper frame that includes a tire storage device according to one embodiment of the present invention.

FIG. 1 is a perspective view of a trailer or camper frame that includes a tire storage device according to one embodiment of the present invention. The depiction of the tire storage device in conjunction with a trailer or camper frame is believed to more clearly depict the tire storage device in a simplified manner. That is, in FIG. 1 the tire storage device is shown as being mounted in an open part of the frame between the arms 33 that connect between the main body or platform 34 of the frame and the hitch connection 35. It is to be understood that FIG. 1 is only presented as a non-limiting exemplary embodiment of the present invention and that in further embodiments involving trucks, vans, recreational vehicles, and other campers, trailers, and other motorized and non-motorized vehicles, including towed vehicles, the tire storage device could be mounted beneath any portion of such trucks, vans, recreational vehicles, campers, trailers, and other motorized and non-motorized vehicles, including towed vehicles.

The tire storage device 1 includes a main support arm 2 which has one end pivotally attached to a portion of the frame by a cooperating tubular assembly 5 that is discussed in more detail below. FIG. 1 depicts the use of U-bolts 30 that are used to secure the mounting plate 8 to the frame member 31.

A tire 26 mounted on the main support arm 2 is depicted as being in a fully stored or latched position. In this position, the tire is substantially horizontal and presents a profile that provides maximum clearance from the ground below.

Figure 2:
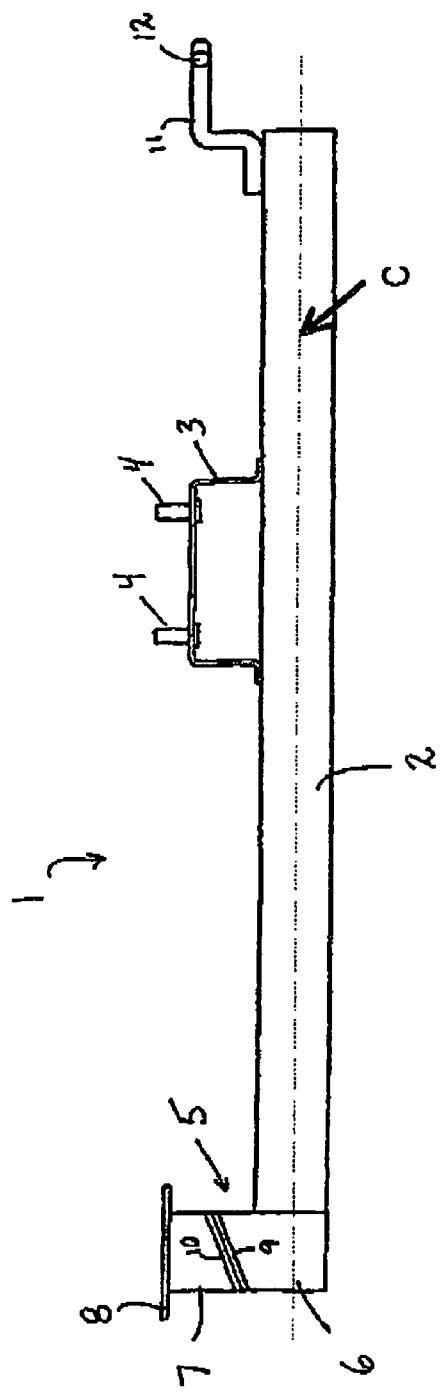
FIG. 2 is a side elevational view of a tire storage device according to one embodiment of the present invention.

FIG. 2 is a side elevational view of a tire storage device according to one embodiment of the present invention. The device or "carrier" generally identified by reference numeral 1 includes a main support arm 2 having a tire mounting bracket 3 attached to a upper portion thereof midway between the opposite ends of the main support arm 2. The tire mounting bracket 3 includes one or more protruding elements 4 that are configured to be received in the lug bolt openings of a wheel to which a spare tire to be secured on the carrier 1 is mounted. According to one embodiment, the protruding elements 4 on the mounting bracket 3 can be threaded elements and a spare tire can be secured to the mounting bracket 3 by passing the threaded elements through lug bolt openings of a wheel to which a spare tire is mounted. Then, the spare tire can be secured to the mounting bracket 3 by tightening threaded nuts on the threaded elements. In alternative embodiments the protruding elements 4 could be configured to receive locking pins or other mechanical fastening means. In still other embodiments the mounting bracket 3 could include bores rather than protruding elements 4 and pins or threaded elements could be inserted through the lug bolt openings of a wheel to which a spare tire is mounted and then into the bores, which can be threaded or provided with a mechanical catch structures. In even further embodiments, a spare tire could be secured to the mounting bracket 3 using securing elements configured to be received through a central opening of a wheel to which a spare tire is mounted. Although the mounting bracket 3 is depicted in the figures as having a rectangular shape and two protruding elements, it is to be understood that the mounting bracket 3 can be square or circular or have any convenient shape and any number of protruding elements 4, or equivalent securing means as discussed above.

The main support arm 2 is an elongate member that can be hollow, e.g. tubular, or solid. The main support arm 2 can have any desired cross sectional shape including square, rectangular, triangular, circular, polygonal, etc. that will support the weight of a tire to be sorted thereon.

The "fixed" end of the carrier 1 includes a cooperating tubular assembly 5 which includes a lower tubular element 6 and an upper tubular element 7. The main support arm 2 is depicted as being attached to the side of the lower tubular element 6. In an alternative embodiment, the main support arm 2 can be attached to the bottom of the lower tubular element 6. In a further embodiment of the present invention, the "fixed" end of the main support arm 2 can be directly connected to, or provided integral with, the lower guide plate 9 discussed in detail below.

The upper tubular element 7 is depicted as being attached to mounting plate 8 that is configured to be attached to the underside of a vehicle. The mounting plate 8 can include through-holes by which it can be bolted to the body, frame or chassis of a vehicle. It is to be understood that the upper tubular element 7 can be mounted to the body, frame or chassis of a vehicle with other than the flat mounting plate 8 that is depicted in the figures. A suitable mounting bracket having any angular or compound angular shape and/or cross-pieces, braces, etc. can be used in place of mounting plate 8 as long as the upper tubular element 7 is mounted so that the carrier 1 is properly oriented, with the main support arm 2 being substantially horizontal when in the stored position.

The lower and upper tubular elements 6, 7 can have any cross sectional shape, including square, circular, etc. A lower guide plate 9 is attached to the top of the lower tubular element 6. An upper guide plate 10 is attached to the bottom of the upper tubular element 7. The lower and upper guide plates 9, 10 are configured to have relative rotational movement between each other as discussed in more detail below.

A latch rod 11 and latch handle 12 are provided at the "free" end of the main support arm 2. The latch rod 11 is configured to cooperate with a latch mechanism which is discussed below with reference to FIG. 4. The latch handle 12 can have any configuration which is convenient to grasp by one operating the carrier 1.

Figure 3:
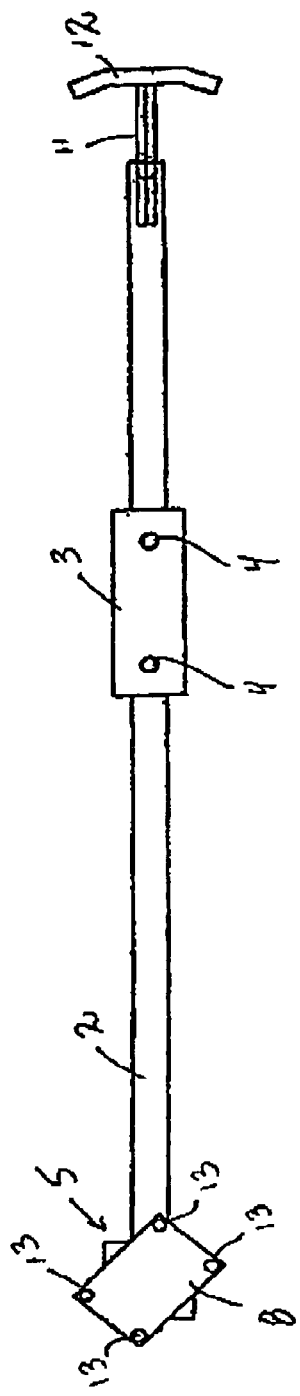
FIG. 3 is a top planar view of the tire storage device of FIG. 2.

FIG. 3 is a top planar view of the tire storage device of FIG. 2. As seen in FIG. 3, the mounting plate 8 can have a rectangular shape with through-holes 13 near each corner for bolting the carrier to the underside of the body, frame or chassis of a vehicle. Likewise, an embodiment of the tire mounting bracket 3 is depicted which is rectangular and has two protruding elements 4. FIG. 3 depicts the latch rod 11 as being attached to the free end of the main support arm 2 and the latch handle 12 as being a formed on the free end of the latch rod 11. In FIG. 2 the latch rod 11 is shown as being attach to the upper surface of the main support arm 2 and extending upward and extending beyond the free end of the main support arm 2.

As will be understood from the description of the latch mechanism below, the latch rod 11 function can be provided by a structure that is separate from the latch handle 12, if desired.

Figure 4:
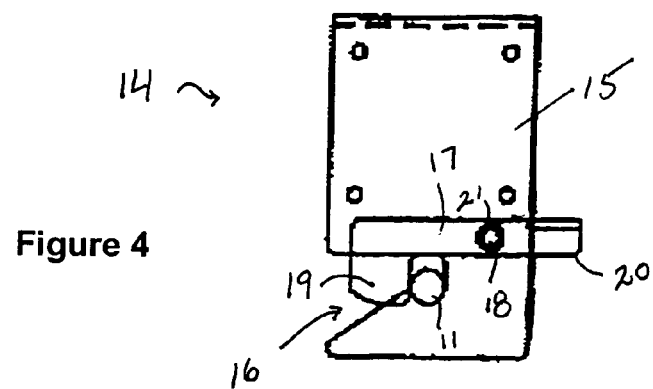
FIG. 4 is a front elevational view of a latch mechanism according to one embodiment of the present invention.

FIG. 4 is a front elevational view of a latch mechanism according to one embodiment of the present invention. The latch mechanism which is generally identified by reference numeral 14 includes a latch bracket 15 that is configured to be attached to the body, frame or chassis of a vehicle in a position whereat the latch rod 11 can engage the latch mechanism 14. The latch bracket includes a slot 16 configured with a ramped approach so that the latch rod 11 can move along and over the ramped approach and thereafter drop into the bottom of the slot 16.

A spring-biased latch 17 is pivotally connected to the latch bracket 15 by a bolt 18 or other suitable pivot pin. The latch 17 is biased to trap latch rod 11 in slot 16 and accordingly includes an arm 19 on one end thereof. The opposite end of the latch 16 includes a lever 20 which can be pushed downward in FIG. 4 to pivot latch 17 clockwise about bolt 18. The lever 20 can be provided with a stop or lever 20 can function as a stop that abuts a portion of latch bracket 15 and prevents the latch 17 from pivoting too far under the biasing force of the spring element 21. Preferably, the arm 19 of latch 17 provides a leading cam surface which, when engaged by the latch rod 11 as the carrier 1 moves into the stored position, causes the latch 17 to pivot clockwise against the biasing force applied to latch 17. The biasing force can be applied by a spring element 21 that can be coupled to bolt 18.

In view of the manner in which the latch mechanism functions, it is to be understood that the latch mechanism 14 can be configured to latch against any portion of the main support arm 2 or structure provide thereon. Likewise, a sliding latch element or any equivalent mechanism could be used in place of a pivoting latch mechanism.

Figure 5:
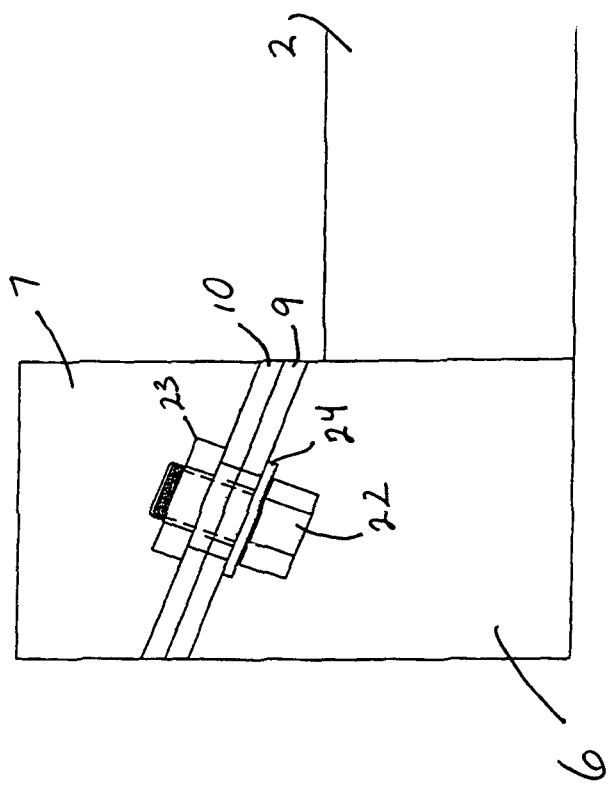
FIG. 5 is a cross sectional view of the cooperating tubular assembly according to one embodiment of the present invention.

FIG. 5 is a cross sectional view of the cooperating tubular assembly 5 according to one embodiment of the present invention. The embodiment of the cooperating tubular assembly 5 depicted in FIG. 5 has a threaded element 22, e.g. bolt or rod, attached to lower guide plate 9 which extends through a central bore in upper guide plate 10. The end of the threaded element which extends through upper guide plate 10 and into upper tube element 7 is held in place by threaded nut 23. A bearing washer 24 made from brass or other suitable material is provided between the inner surface of lower guide plate 10 and end of threaded element 22. The threaded element 22 can be a threaded bolt that is received in a central bore in lower guide plate 9 and secured, e.g. welded in position, and a bearing washer 24 made from brass or other suitable material can be provided between the inner surface of upper guide plate 10 and threaded nut 23.

According to an alternative embodiment of the invention, the threaded element 22 could be fixed to upper guide plate 10 and extend though a central bore in lower guide plate 9. In this alternative embodiment, the bearing washer 24 and threaded nut 23 would be attached to threaded element 22 inside of lower tubular element 6. In a further embodiment of the present invention a threaded bolt or rod could pass through central bores in each of the upper and lower guide plates 9, 10 and be secured by threaded nut(s) without being welded or otherwise permanently fixed to either of the guide plates 9, 10. In this embodiment bearing washers could be provided on each of the opposite ends of the threaded bolt or rod. It is noted that rather than being tubular, at least one of the upper and lower tubular elements 6, 7 could be solid with a threaded element projecting from an end thereof and passing through the guide plate of the adjacent tubular element.

Figure 6:
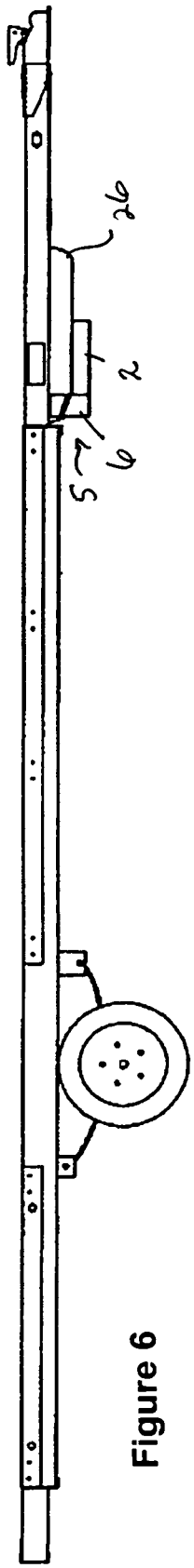
FIGS. 6-8 depict the manner in which the carrier moves between its stored or latched position and its accessible position in which a spare tire mounted thereon is easily removed.
Figure 7:
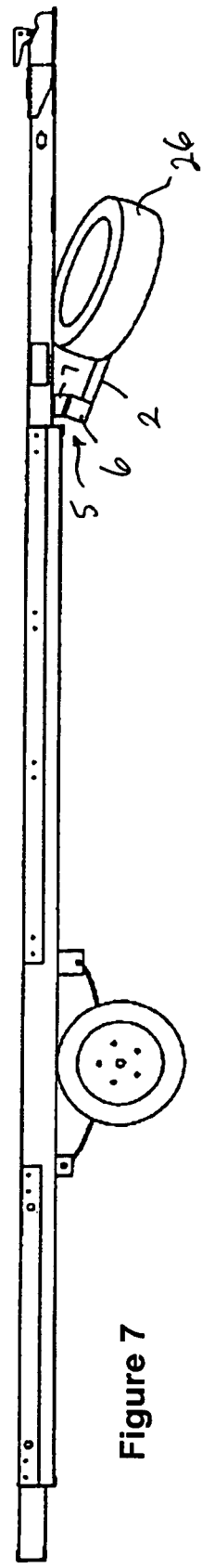
Figure 8:
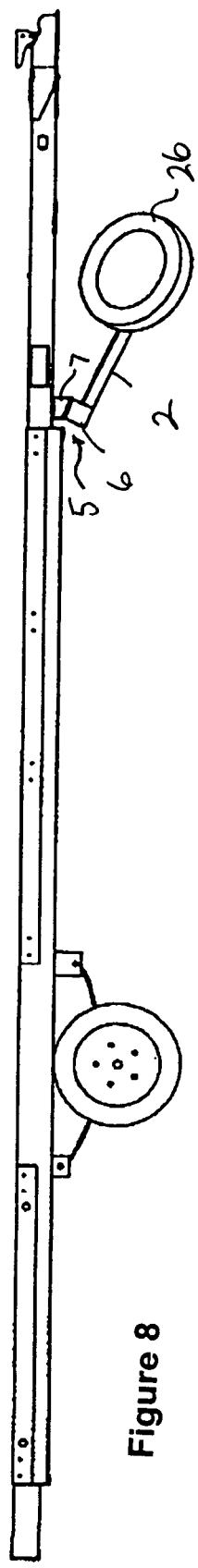

FIGS. 6-8 depict the manner in which the carrier 1 moves between its stored or latched position and its accessible position in which a spare tire mounted thereon is easily removed. In FIG. 6 the carrier 1 is in its stored or latched position. In this position, the latch rod 11 is held by latch mechanism 14 against any forces such as bumps, jars or vibrations which could tend to otherwise cause the carrier to move out of its stored position. In this stored position the spare tire 26 would be substantially horizontal. Also, the carrier 1 having the spare tire 26 mounted thereon is in its highest position.

By pushing down on latch lever 20 and pivoting latch 17 about latch bolt 18 the latch mechanism 14 releases latch rod 11, thereby allowing one to pivot the free end of the main support arm 2 with respect to the cooperating tubular assembly 5. As the lower tubular element 6 pivots with respect to the upper tubular element 7, the angle at which the guide plates 9, 10 are attached, causes the main support arm 2 to simultaneously rotate about its own axis while the free end thereof moves in a downward direction.

FIG. 7 depicts an intermediate position in which the carrier 1 is between its stored or latched position and the position in which a spare tire mounted thereon is fully accessible. In FIG. 7 it can be seen that tire 26 mounted on the main support arm 2 is no longer horizontal with its central axis being vertical. Rather, the central axis of the spare tire 26 mounted on the main support arm 2 in FIG. 7 is at an angle off the vertical and coming out of FIG. 7 at an inclined angle.

FIG. 8 depicts the carrier 1 in the fully accessible position in which spare tire 26 mounted thereon can be easily removed (or remounted). In FIG. 8 it can be seem that spare tire 26 mounted on the main support arm 2 that the central axis of the tire 26 is more vertically aligned than in the intermediate position depicted in FIG. 7. In this position, access to the spare tire 26 is such to allow the spare tire 26 to easily removed from (or remounted on) the main support arm 2.

It is to be understood that the angle at which upper and lower guide plates 10, 9 are fixed with respect to the upper and lower tube elements 7, 6 effects the movement of the main support arm 2 as shown in FIGS. 6-8. Accordingly, depending on the clearance height between ground and the frame or chassis to which the tire support device of the present invention is to be installed, the angle at which upper and lower guide plates 10, 9 are fixed with respect to the upper and lower tube elements 7, 6 can be chosen to provide desired lowering/pivoting of the main support arm 2. Likewise, the angle at which the cooperating tubular assembly 5 is attached to the frame or chassis will effect the movement of the main support arm 2 with respect to the frame or chassis.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:
1. A spare tire carrier for vehicles which comprises:
 a support arm for mounting a spare tire thereon, said support arm having a fixed end, a free end and a central axis; and
 a cooperating tubular assembly coupled to the fixed end of the support arm for mounting the support arm on a vehicle, said cooperating tubular assembly including upper and lower tubular members and upper and lower opposed planar guide plates wherein the upper guide plate is attached to the upper tubular member and the lower guide plate is attached to the lower tubular member and the upper and lower opposed planar guide plates are coupled together so as to allow for relative rotational movement of said upper and lower opposed planar guide plates about a common axis which extends through the upper and lower guide plates, whereby relative rotational movement of the upper and lower guide plates about said common axis simultaneously causes the support arm to rotate about its central axis while pivoting the central axis of the support arm with respect to the cooperative tubular assembly, said upper and lower tubular members having a common central axis of pivot.

2. A spare tire carrier for vehicles according to claim 1, wherein the upper and lower tubular members each have a central axis and the upper and lower guide plates are respectively attached to the upper and lower tubular members at an angle that is non-perpendicular to the central axes of the upper and lower tubular members.

3. A spare tire carrier for vehicles according to claim 1, wherein at least one of the upper and lower tubular members is hollow.

4. A spare tire carrier for vehicles according to claim 1, wherein the upper and lower guide plates are coupled together about an axially central element that extends through at least one of the upper and lower guide plate.

5. A spare tire carrier for vehicles according to claim 4, wherein the axially central member comprises a threaded member.

6. A spare tire carrier for vehicles according to claim 1, further including a latch mechanism for engaging the free end of the support arm.

7. A spare tire carrier for vehicles according to claim 1, further including a tire mounting bracket on a central portion of the support arm.

8. A vehicle including a spare tire carrier mounted to an under side of the vehicle, which spare tire carrier comprises:
 a support arm for mounting a spare tire thereon, said support arm having a fixed end and a free end and a central axis; and
 a cooperating tubular assembly coupling the fixed end of the support arm to the under side of the vehicle,
 said cooperating tubular assembly including upper and lower tubular members and upper and lower opposed planar guide plates wherein the upper guide plate is attached to the upper tubular Member and the lower guide plate is attached to the lower tubular member and the upper and lower opposed planar guide plates are coupled together so as to allow for relative rotational movement of said upper and lower opposed planar guide plates about a common axis which extends through the upper and lower guide plates, whereby relative rotational movement of the upper and lower guide plates about said common axis simultaneously causes the support arm to rotate about its central axis while pivoting the central axis of the support arm with respect to the cooperative tubular assembly, said upper and lower tubular members having a common central axis of pivot.

9. A vehicle including a spare tire carrier mounted to an under side of the vehicle according to claim 8, wherein the upper and lower tubular members each have a central axis and the upper and lower guide plates are respectively attached to the upper and lower tubular members at an angle that is non-perpendicular to the central axes of the upper and lower tubular members.

10. A vehicle including a spare tire carrier mounted to an under side of the vehicle according to claim 8, wherein at least one of the upper and lower tubular members is hollow.

11. A vehicle including a spare tire carrier mounted to an under side of the vehicle according to claim 8, wherein the upper and lower guide plates are coupled together about an axially central element that extends through at least one of the upper and lower guide plate.

12. A vehicle including a spare tire carrier mounted to an under side of the vehicle according to claim 11, wherein the axially central member comprises a threaded member.

13. A vehicle including a spare tire carrier mounted to an under side of the vehicle according to claim 8, further including a latch mechanism for engaging the free end of the support arm.

14. A vehicle including a spare tire carrier mounted to an under side of the vehicle according to claim 13, wherein the free end of the support arm includes structure for the latch mechanism to engage.

15. A vehicle including a spare tire carrier mounted to an under side of the vehicle according to claim 8, wherein the vehicle comprises one of a motor vehicle and a non-motor vehicle.

16. A vehicle including a spare tire carrier mounted to an under side of the vehicle according to claim 15, wherein the vehicle comprises a towed vehicle.

17. A vehicle including a spare tire carrier mounted to an under side of the vehicle according to claim 16, wherein the vehicle comprises one of a camper and a trailer.

18. A vehicle including a spare tire carrier mounted to an under side of the vehicle according to claim 8, further including a tire mounting bracket on a central portion of the support arm.

* * * * *